R. E. FARRINGTON.
Pruning-Implements.
No. 149,848. Patented April 21, 1874.
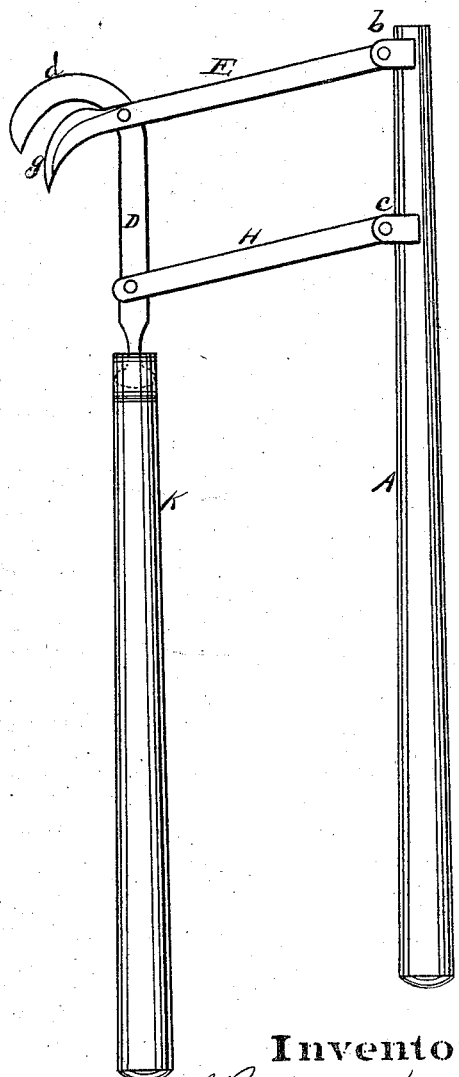
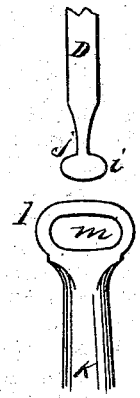
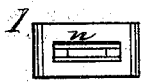
Witnesses
Geo. H. Strong
C. Milton Richardson
Inventor
Rufus E. Farrington
By his Atty's
Dewey & Co.

UNITED STATES PATENT OFFICE.

RUFUS E. FARRINGTON, OF ANAHEIM, CALIFORNIA.

IMPROVEMENT IN PRUNING IMPLEMENTS.

Specification forming part of Letters Patent No. 149,848, dated April 21, 1874; application filed January 15, 1874.

*To all whom it may concern:*

Be it known that I, R. E. FARRINGTON, of Anaheim, Los Angeles county, State of California, have invented an Improved Pruning Implement; and I do hereby declare the following description and accompanying drawings are sufficient to enable any person skilled in the art or science to which it most nearly appertains to make and use my said invention or improvement without further invention or experiment.

My invention relates to that class of pruning implements in which the hook or upper blade is supported by one staff or handle, while the cutting-blade is operated by another staff or handle. My improvement consists of a novel combination of the handles and blades, by which the implement is rendered easier to operate among the high branches of a tree, and more controllable.

Referring to the accompanying drawing, Figure 1 is a side elevation. Fig. 2 is an enlarged view of a part, showing the manner of connecting the handle. Fig. 3 is an end view of the cap.

A is a long staff or handle, having two lugs, $b$ $c$, one at its upper end, and the other a short distance below it. D is a metal bar, having a hook, $d$, formed at its upper end, and having the concave edge of this hook sharpened. This bar D I connect with the staff A by means of a shank, E, the end of which is formed into a convex knife-blade, $g$. The end of the shank E, I secure to the upper lug $b$ by a rivet or other equivalent means, while the opposite end, near the knife-blade, is riveted to the shank of the hook D in the proper position to allow the two blades to work together in the manner of a pair of pruning-shears. I then employ a rod or bar, H, for connecting the lower lug, $c$, with the shank of the hook D below the shank E, and parallel with it, so that the shank E and rod H serve as parallel lever and connecting rods for operating the blades. Upon the lower end of the shank D, I form a flat button, $i$, by reducing or cutting away the metal upon each side of the shank, just above it, so as to leave the button connected with the shank by a neck, $j$. K is a handle, having its upper end provided with a metal cap-piece, $l$. This cap-piece has a transverse opening, $m$, through it, and a slot, $n$, leading from its end down into the transverse opening. The slot is just large enough to allow the flat button $i$ to pass through it into the opening, when, by turning the handle slightly, the two parts will be locked together, so that the handle forms an extension of the shank D, and connected to it by a flexible joint. The object of this flexible joint is to permit of the ready manipulation of the implement, in order to swing the limb which is to be cut out of the way of other branches.

The construction of this implement is simple and strong, and, having two parallel connecting-rods, the movements of the blades are steadied, so that the implement can be easily handled.

Having thus described my invention, what I claim, and desire to secure by Letters Patent, is—

The staff A and cutting device E H D, in combination with the additional removable staff K, as described, and for the purpose set forth.

In witness whereof I hereunto set my hand and seal.

RUFUS E. FARRINGTON. [L. S.]

Witnesses:
 J. W. CLARK,
 FRED. W. ATHEAIN.